US011960712B1

(12) United States Patent
Altyeva

(10) Patent No.: US 11,960,712 B1
(45) Date of Patent: Apr. 16, 2024

(54) PRE-RELEASE OF RECORDINGS FOR DIGITAL STREAMING PLATFORMS

(71) Applicant: Lemon Inc., Grand Cayman (KY)

(72) Inventor: Maria Yurievna Altyeva, London (GB)

(73) Assignee: LEMON INC., Grand Cayman (KY)

( * ) Notice: Subject to any disclaimer, the term of this patent is extended or adjusted under 35 U.S.C. 154(b) by 0 days.

(21) Appl. No.: 18/050,409

(22) Filed: Oct. 27, 2022

(51) Int. Cl.
*G06F 3/04847* (2022.01)
*G06F 3/0482* (2013.01)
*G06F 3/16* (2006.01)

(52) U.S. Cl.
CPC ........ *G06F 3/04847* (2013.01); *G06F 3/0482* (2013.01); *G06F 3/165* (2013.01)

(58) Field of Classification Search
CPC ..... G06F 3/04847; G06F 3/0482; G06F 3/165
See application file for complete search history.

(56) References Cited

U.S. PATENT DOCUMENTS

| 11,430,050 B2* | 8/2022 | Coker | G06Q 20/401 |
|---|---|---|---|
| 2005/0177386 A1* | 8/2005 | Essa | G06Q 30/02 |
| | | | 705/5 |
| 2011/0264551 A1* | 10/2011 | Lau | G06Q 30/06 |
| | | | 705/26.3 |
| 2013/0125153 A1* | 5/2013 | Hilson | H04N 21/2393 |
| | | | 725/32 |

* cited by examiner

*Primary Examiner* — Cao H Nguyen
(74) *Attorney, Agent, or Firm* — Alleman Hall & Tuttle LLP

(57) ABSTRACT

A computer system is provided for implementing a pre-release of a recording at a distribution platform. The computer system includes a processor coupled to a storage system that stores instructions, which, upon execution by the processor, cause the processor to present a release interface for the recording. The release interface includes graphical controls element for confirming the pre-release of the recording, for selecting a release date, and for selecting a pre-release date. The instructions further cause the processor to receive information describing a confirmation of the pre-release of the recording, a selected release date, and a selected pre-release date. The instructions further cause the processor to provide a truncated version of the recording for the pre-release of the recording. The instructions further cause the processor to transmit the truncated version of the recording to a digital streaming platform.

20 Claims, 7 Drawing Sheets

PRE-RELEASE OF RECORDINGS FOR DIGITAL STREAMING PLATFORMS

BACKGROUND

Digital streaming platforms (DSPs) provide on-demand online entertainment for their users, typically through a subscription model. As an alternative to file downloading, the user can stream media content such as video and audio data in real-time and start playing the video or audio before the entire file has been transmitted. DSPs provide a platform for artists to exhibit and promote their works while earning income through various licensing and royalties arrangements.

SUMMARY

A computer system is provided for implementing a pre-release of a recording at a distribution platform. The computer system includes a processor coupled to a storage system that stores instructions, which, upon execution by the processor, cause the processor to present a release interface for the recording. The release interface includes a first graphical control element having options for confirming the pre-release of the recording, a second graphical control element having options for selecting a release date, and a third graphical control element having options for selecting a pre-release date. The instructions further cause the processor to receive information describing a confirmation of the pre-release of the recording, a selected release date, and a selected pre-release date. The instructions further cause the processor to provide a truncated version of the recording for the pre-release of the recording. The instructions further cause the processor to transmit the truncated version of the recording to a digital streaming platform, wherein the transmitted truncated version of the recording includes metadata describing the selected pre-release date.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Artists have many different avenues and channels in which to release their recordings. Generally, artists tend to release their recordings on multiple platforms to reach a larger audience. For example, an artist releasing a music track on streaming platforms will typically release it on multiple DSPs at the same time for widespread exposure. However, simultaneous widespread release of the music track limits the marketing and advertising opportunities available. As with most musical works, developing momentum in the promotion of an upcoming music track can have a significant impact on its popularity at the time of release. As such, the artist can choose to pre-release a truncated version of their music track to drive publicity of their work before a full release date.

The present disclosure provides systems and methods for a release interface enabling users, such as artists and distributors, to offer a pre-release of their recordings on a digital streaming platform. Pre-releases of recordings provide a channel for artists to distinguish and promote their work on DSPs that are saturated with other content by offering a sampling of their recording to the public before the full release date of said recording. A pre-release can be offered in the form of a truncated version of the recording released before a full release of the recording in its entirety.

Release interfaces in accordance with the present disclosure include an option for users to decide whether to offer a pre-release. A release interface can be implemented during an initial scheduling of the recording. For example, in addition to an option for users to decide whether to offer a pre-release, the interface can include options for a user to select the full release date and time of their recording. The release interface can further include options for users to select the pre-release date and time. Various constraints on the selections can be implemented. For example, selection of the release date can be limited to dates after the current date. These and other pre-release implementations are discussed below in further detail.

Figure 1:
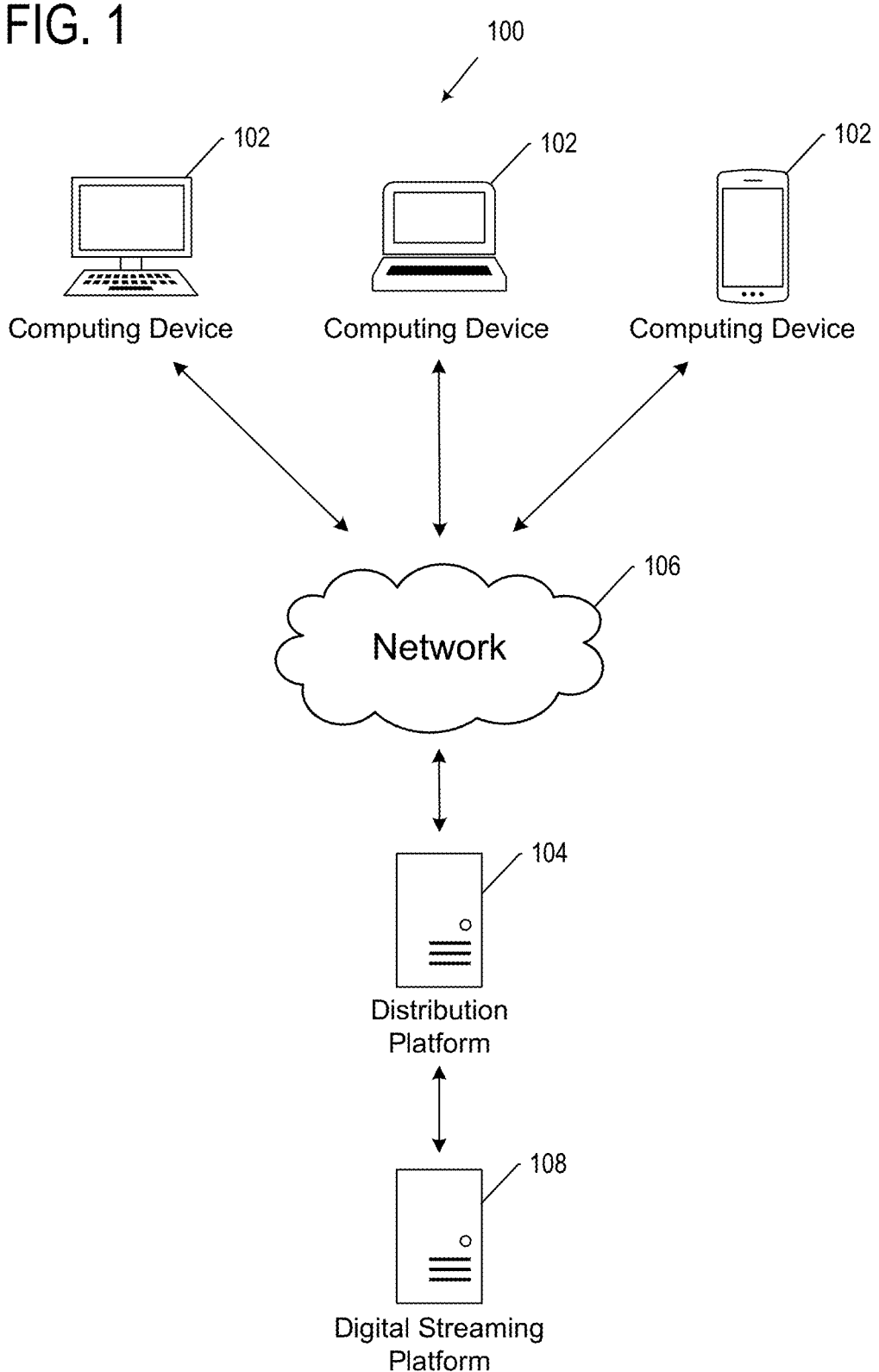
FIG. 1 is a diagram schematically illustrating an example system for implementing pre-releases of recordings.

FIG. 1 is a diagram schematically illustrating an example system 100 for implementing pre-releases of recordings. The system 100 includes a plurality of client computing devices 102 in communication with a distribution platform device 104 through a communication network 106. The system 100 further includes at least one digital streaming platform device 108 in communication with the distribution platform device 104. In some implementations, the distribution platform device 104 and the digital streaming platform device 108 are located on the same platform. The distribution platform device 104 is implemented to present a release interface for recordings to the client computing devices 102 for display. The release interface includes various graphical control elements, including a graphical control element having options for confirming a pre-release of the recording. Graphical control elements for collecting other various information can be implemented in the release interface. For example, the release interface can further include graphical control elements having options for selecting a release date, a release time, a pre-release date, a pre-release time, etc. Upon receiving input information from a client computing device 102 confirming the pre-release of a recording, the distribution platform device 104 provides a truncation of the recording, which is then transmitted to the digital streaming platform device 108 for publishing.

Each of the client computing devices 102 can represent various forms of processing devices. Example processing devices can include a desktop computer, a laptop computer, a handheld computer, a tablet computer, a personal digital assistant, a smart phone, a game console, or a combination of any these data processing devices or other data processing devices. The distribution platform device 104 and the digital streaming platform device 108 can represent various forms of servers including, but not limited to a web server, an application server, a proxy server, a network server, or a server farm. The computing devices 102, 104, 108 can communicate through wired connections or wirelessly (e.g., through communication network 106). The system 100 can be a distributed client/server system that spans one or more networks such as the communication network 106.

Figure 2:
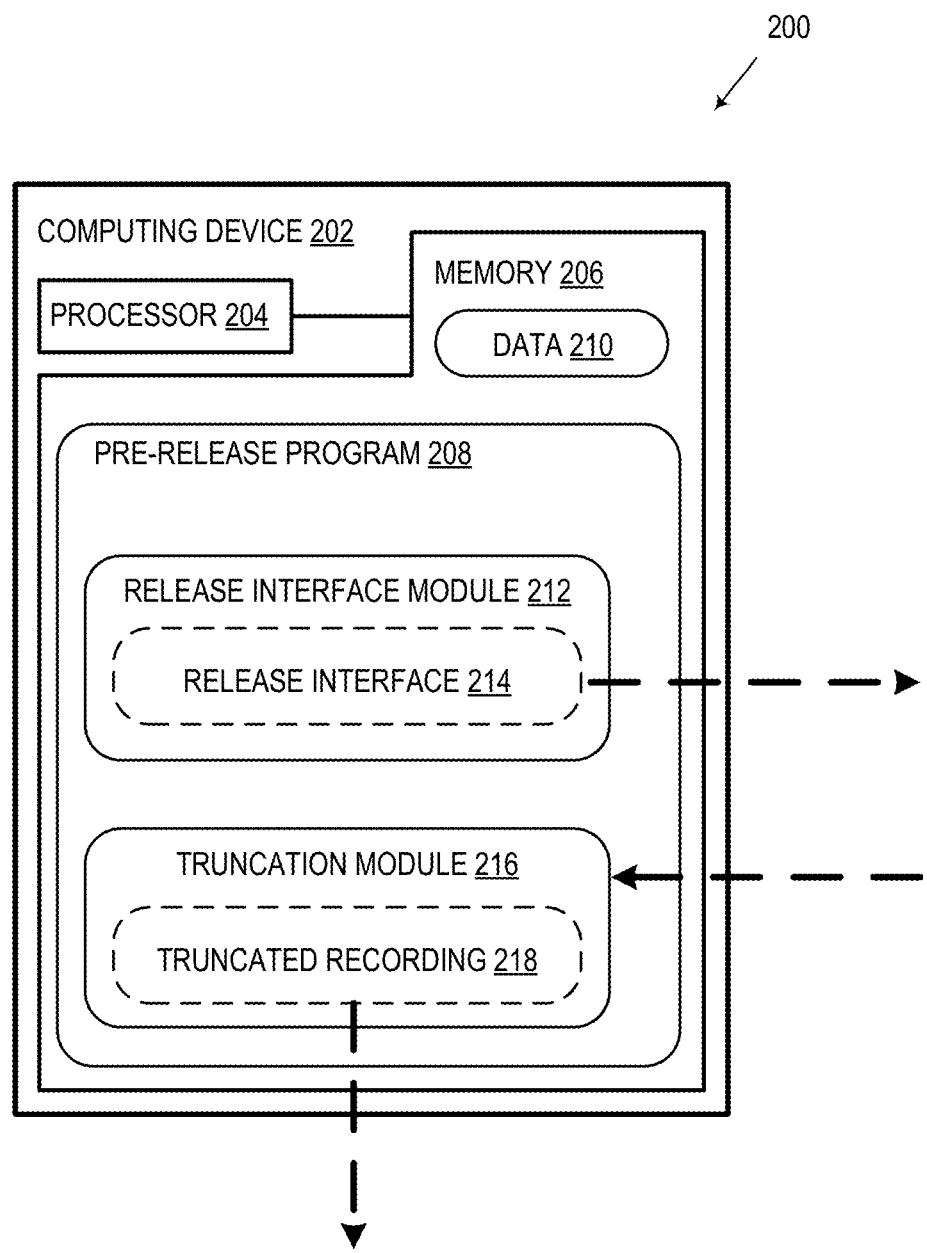
FIG. 2 is a diagram schematically illustrating an example computing system having a computing device configured to implement pre-releases of recordings, which may be utilized to implement the distribution platform device of FIG. 1.

FIG. 2 is a diagram schematically illustrating an example computing system 200 having a computing device 202 configured to implement pre-releases of recordings, which may be utilized to implement the distribution platform device 104 of FIG. 1. The computing device 202 includes a processor 204 (e.g., central processing units, or "CPUs") and memory 206 (e.g., volatile and non-volatile memory) operatively coupled to each other. The memory 206 stores a pre-release program 208, which contains instructions for the various software modules described herein for execution by the processor 204. The memory 206 also stores data 210 for use by the pre-release program 208 and its software modules.

Upon execution by the processor 204, the instructions stored in the pre-release program 208 cause the processor 204 to implement a release interface module 212 to present a release interface 214 to an external computing device (not shown) for display. For example, the release interface 212 can be presented to a client computing device such as those described in FIG. 1. In some implementations, the release interface 214 is retrieved from data 210 stored in memory 206. The release interface 212 includes a plurality of graphical control elements for a user of the external computing device to select and determine various attributes related to the recording to be released. For example, the release interface 212 can include graphical control elements having options for confirming a pre-release of the recording. The release interface 212 can also include graphical control elements having options for selecting the release date, release time, pre-release date, pre-release time, etc.

The computing device 202 is configured to receive information describing selected options of the graphical control elements from the external computing device. The computing device 202 receives information describing at least a confirmation of the pre-release of the recording, a selected release date, and a selected pre-release date. In some implementations, the computing device 202 receives information describing a selected release time and a selected pre-release time. In response to a confirmation of the pre-release of the recording, the pre-release program 208 implements a truncation module 216 to provide a truncated version of the recording 218.

The truncation module 216 can be implemented in various ways to provide the truncated version of the recording 218. For example, the truncation module 216 can provide the truncated version of the recording by receiving an uploaded file of a truncated recording. In some implementations, the truncation module 216 provides a data file of the recording and generates the truncated version of the recording using the provided data file of the recording. A data file of the recording can be provided through various means, including receiving an upload of the recording by the user of the external computing device.

The truncated version of the recording 218 may be generated manually. For example, the administrator of the computing system 200 can manually generate a truncated version of the recording 218 by trimming the provided data file of the recording. The truncated version of the recording 218 may also be generated or through automatic means. One example process for generating a truncated version of the recording 218 includes providing a graphical control element having options for selecting at least one truncation point. In such cases, the received information from the external computing device includes at least one selected truncation point. The truncation point(s) can describe the time point(s) in the recording at which to trim the recording. The truncation module 216 utilizes the provided data file of the recording and the received information describing the truncation point(s) to generate a truncated version of the recording 218.

Another example process includes the use of deep learning and neural networks. For example, the truncation module 216 can provide a neural network that has been trained to select a section of a provided recording based on different criteria. In some implementations, the neural network is trained to select a section of a chorus to a music track. In other implementations, the neural network is trained to select a section based on various music theory elements. For example, the neural network can be trained to detect certain pitches, rhythms, melodies, etc. Different neural network types can be utilized, including convolutional neural networks (CNNs), recurrent neural networks (RNNs), bi-directional long short term memory (LSTM) RNNs, encoder-decoder transformers, encoder-only transformers, Siamese networks, etc.

After the truncated version of the recording 218 is provided, the pre-release program 208 is configured to transmit the truncated version of the recording 218 to an external system for publishing. For example, the truncated version of the recording 218 can be transmitted to one or more digital streaming platforms for publishing.

Implementing pre-releases can involve different issues related to the licensing of the recording. Typically, licensing agreements for DSPs involve royalty payouts based on the number of times a music track has been streamed. Pre-releases would complicate this matter. In some cases, separate licenses are implemented for the pre-release and full release. For example, the truncated version of the recording can be licensed separately from the full version of the recording. In such cases, the truncated version can be licensed to a first DSP with a specified pre-release time, and the full version and/or the truncated version can be licensed to one or multiple DSPs, including the first DSP, with a specified release time. A common standard for formatting the metadata of the recording files can be implemented to simplify licensing issues and to promote uniformity across multiple DSPs. For example, the Digital Data Exchange (DDEX) standard format (as defined by Digital Data Exchange, LLC headquartered in New York, USA) can be implemented with the recording and the truncated version of the recording. The DDEX standard defines an approach for the business-to-business communication of information between organizations operating in the digital media supply chain. The approach standardizes the formats in which metadata information, such as credit attribution, is represented in files exchanged between multiple entities, allowing for more effective communications.

Referring back to FIG. 2, the truncated version of the recording 218 can include metadata describing the selected pre-release date. The digital streaming platform(s) receiving the truncated version of the recording 218 uses the metadata to determine when to publish the truncated version of the recording 218. In some implementations, the pre-release program 208 further transmits the recording in its entirety, where the recording includes metadata describing the selected release date and the digital streaming platform uses such metadata to determine when to publish the recording.

Figure 3:
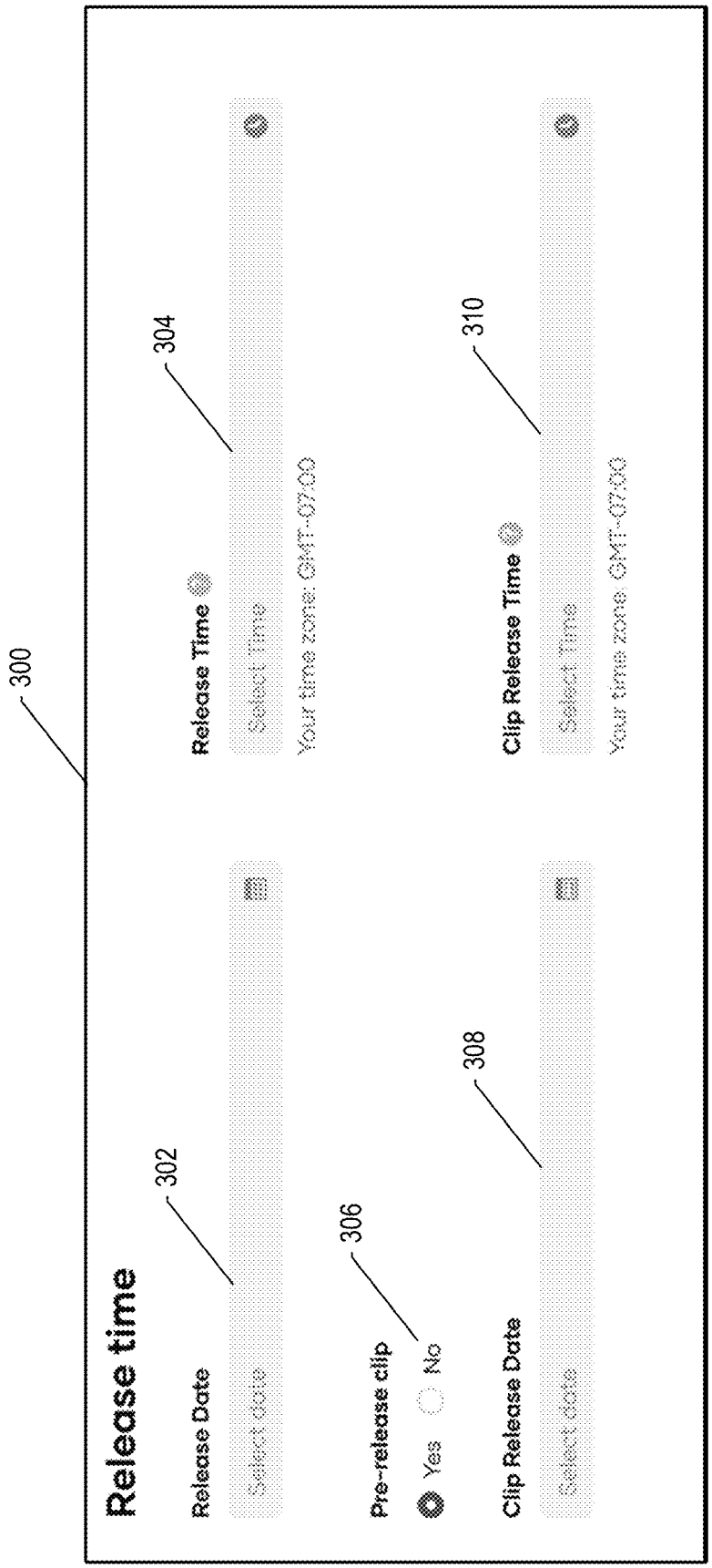
FIG. 3 schematically illustrates an example user interface for implementing pre-releases of recordings.

The release interface for recordings can be implemented in many different ways. For example, a graphical user interface can be presented to a user to make selections on various features of the recording, including release date, release time, the offering of a pre-release, etc. FIG. 3 schematically illustrates an example user interface 300 for implementing pre-releases of recordings. The user interface 300 is an interface for providing information on the release of a recording. The user, typically the artist of the recording, make selections to inform the receiving device, such as a distribution platform, on their decisions regarding the release of the recording. For example, the user interface 300 can include various graphical control elements that allows the user to select from a set of predefined options to provide information to the receiving device. In FIG. 3, the user interface 300 includes options regarding the release date 302 and the release time 304 for the recording. Various types of graphical control elements can be implemented. For example, the options for the release date 302 can be implemented with a date picker. The options for the release time can be implemented with a drop-down list. Various constraints can be enforced to limit the options available for logical consistency. For example, the options for the release date 302 can be limited to dates after the current date. In other implementations, selection of a release date 302 before the current date 304 informs the receiving device to release the recording as early as allowed by the distribution platform's protocols, such as pending a review of the recording and/or a truncated version of the recording.

The user interface 300 further includes options for the offering of a pre-release 306 of the recording. In FIG. 3, the options for the offering of a pre-release 306 are implemented using "Yes/No" radio buttons. As shown, the "Yes" option is selected, and the user interface 300 includes further options for the pre-release date 308 and pre-release time 310. In some implementations, the options for the pre-release date 308 and pre-release time 310 are displayed only after the "Yes" radio button for the offering of a pre-release is selected. Similar to the options for the release date 302 and the release time 304, various constraints can be applied to the options for the pre-release date 308 and pre-release time 310. For example, the options for the pre-release date 308 can be limited to dates before the selected release date 302. In other implementations, selection of a pre-release date 308 before the release date 302 limits the options for the release date 302. In some implementations, the options for selecting the pre-release time preclude options where the selected pre-release date and time is less than twenty-four hours before the selected release date and time.

Figure 4:
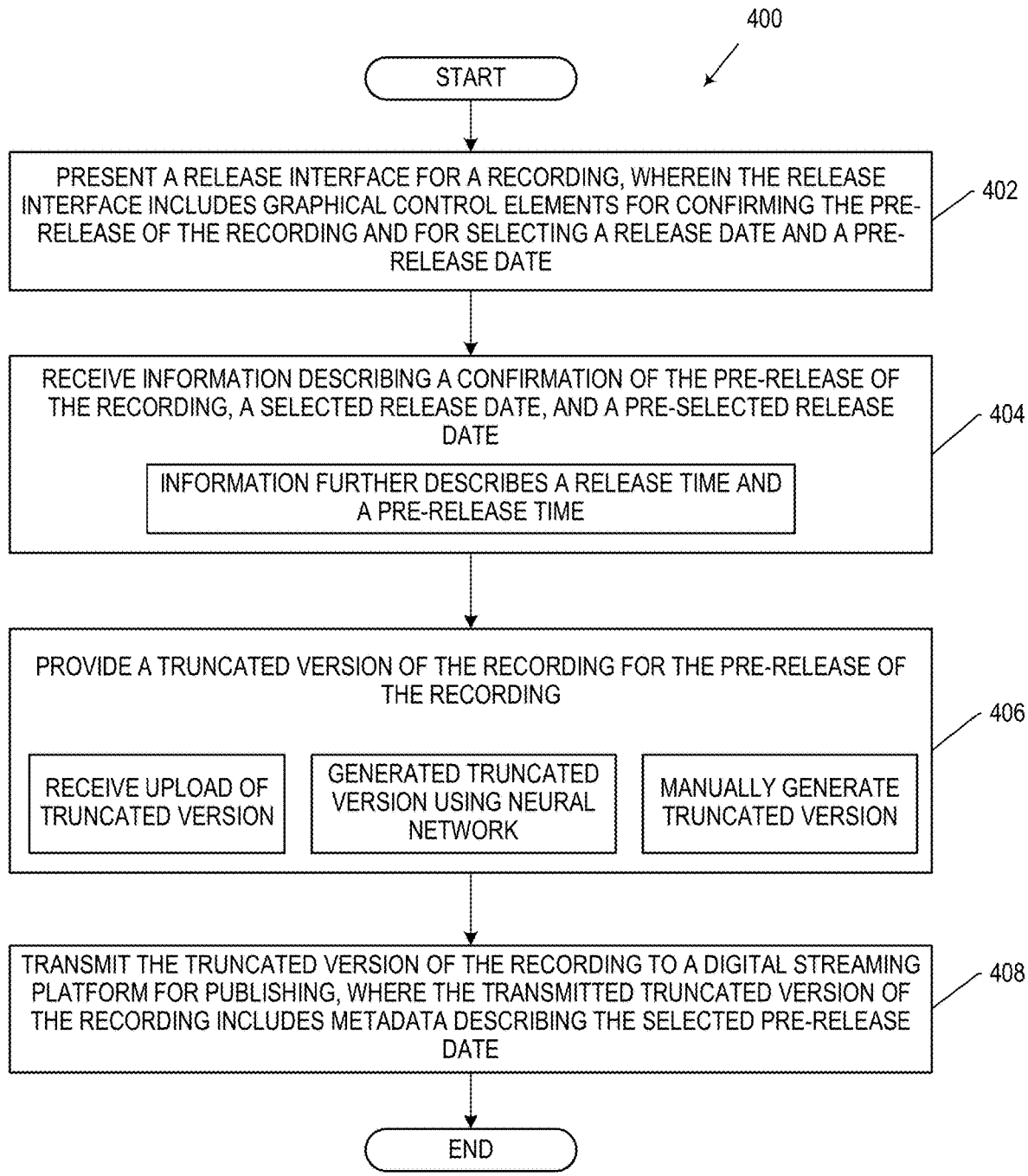
FIG. 4 is a flow diagram schematically illustrating an example method for implementing pre-releases of recordings, which may be enacted on the computing system of FIG. 2.

FIG. 4 is a flow diagram schematically illustrating an example method 400 for implementing pre-releases of recordings. At 402, the method 400 includes presenting a release interface for a recording. The release interface includes a first graphical control element having options for confirming the pre-release of the recording, a second graphical control element having options for selecting a release date, and a third graphical control element having options for selecting a pre-release date. Such information can be obtained from various graphical control elements. For example, the release interface can include radio buttons having "Yes/No" options for the user to select whether to offer a pre-release. Other examples include the use of date pickers for the user to select the release date and the pre-release date. In some implementations, the release interface further includes graphical control elements having options for selecting a release time and a pre-release time. In such cases, the release interface can include drop-down lists, or any other graphical control element, for the user to select the release time and the pre-release time. Various constraints can be enforced upon the selections of the dates and times. For example, the pre-release date and time selected can be constrained to at least twenty-four hours before the release date. In some implementations, the options preclude selections where a selected pre-release date is on the same date as or after the selected release date.

At 404, the method 400 includes receiving information describing a confirmation of the pre-release of the recording, a selected release date, and a selected pre-release date. As described above, various constraints can be applied upon the selections. For example, the received information typically describes a selected pre-release date that is before the selected release date. In some implementations, the received information further describes a selected release time and a selected pre-release time, and wherein the truncated version of the recording includes metadata describing the pre-release time At 406, the method 400 includes providing a truncated version of the recording for the pre-release of the recording. A truncated version of the recording can include various forms. For example, for music tracks, a truncated version can be a shortened clip, such as a fifteen to sixty-second segment of the music track. Clips of other lengths may also be utilized. The recording and the truncated version of the recording can include similar international standard codes for uniquely identifying media recordings, such as the International Standard Recording Code (ISRC) codified as ISO 3901. The recording and the truncated version of the recording can also include different product codes for uniquely identifying a trade item, such as the Universal Product Code (UPC) as set out by international standards.

In some implementations, the truncated version of the recording is provided by the user through an uploaded file. In other implementations, the recording is first provided, and a truncated version of the recording can be generated from the provided recording through manual or automatic means. For example, one example process for generating a truncated version of the recording includes providing a graphical control element having options for selecting at least one truncation point. In such cases, the received information describes at least one selected truncation point. The truncation point(s) can describe the time point(s) in the recording at which to trim the recording. A data file of the recording and the received information describing the truncation point(s) can be used to generate a truncated version of the recording.

Another example includes generating truncated versions of recordings using trained neural networks. Such implementations can include neural networks trained to select a section of the recording based on different criteria. In some implementations, the neural network is trained to select a section of a chorus to a music track. In other implementations, the neural network is trained to select a section based on various music theory elements. For example, the neural network can be trained to detect certain pitches, rhythms, melodies, etc.

At 408, the method 400 includes transmitting the truncated version of the recording to a digital streaming platform, where the transmitted truncated version of the recording includes metadata describing the selected pre-release date.

Figure 5:
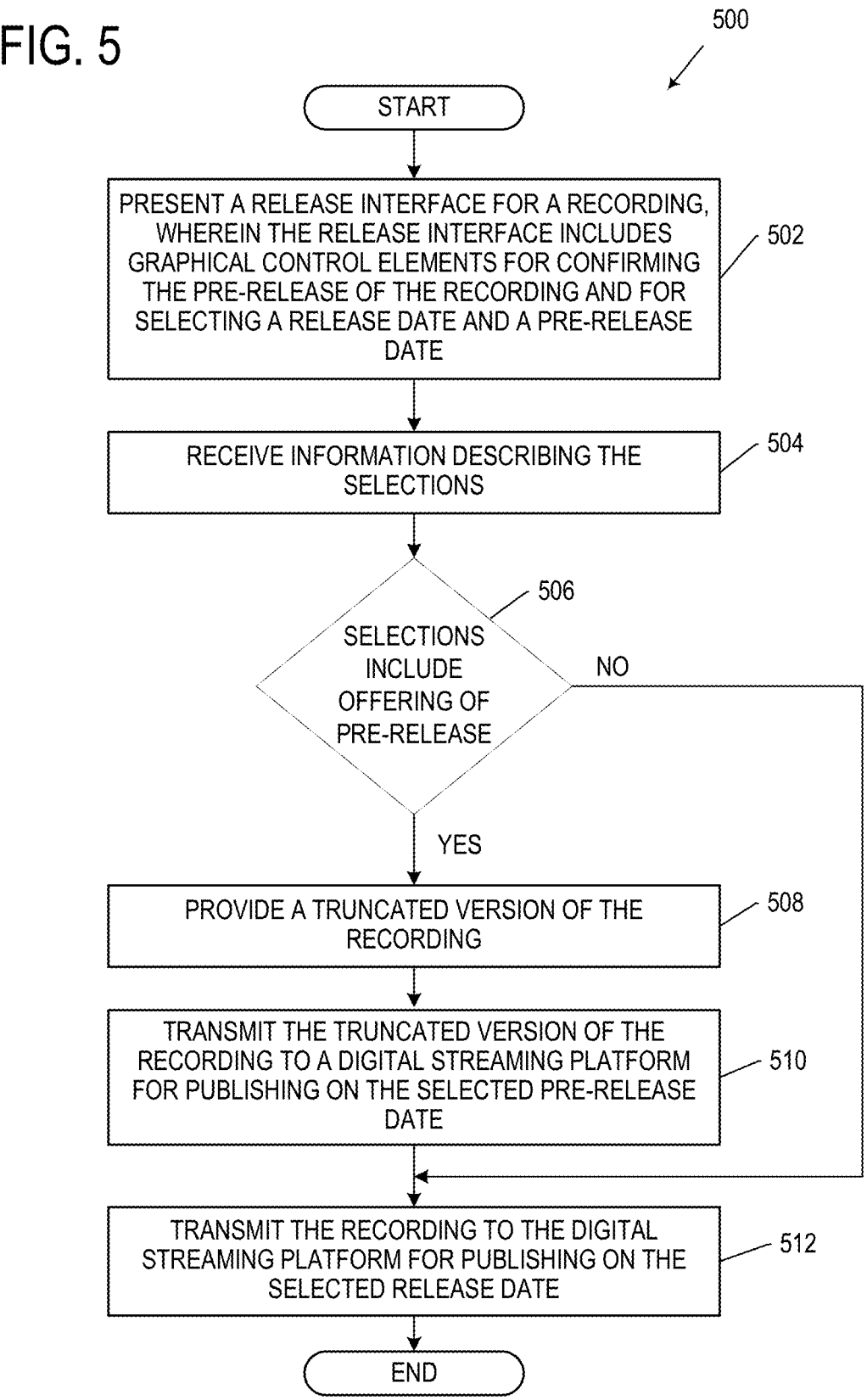
FIG. 5 is a flow diagram schematically illustrating an example process of implementing a pre-release within a full release of a recording, which may be enacted on the computing system of FIG. 2.

Referring to FIG. 4, the method 400 can be implemented as an addition to the general process of releasing the recording. For example, the decision to offer a pre-release and the offering of the pre-release can be applied during the general process of releasing the recording. FIG. 5 is a flow diagram schematically illustrating an example process 500 of implementing a pre-release within a full release of a recording. At 502, the process 500 includes presenting a release interface for a recording. The release interface can include a graphical control element that allows the user to select from a set of predefined options. In some implementations, the release interface includes graphical control elements that allow the user to select a release date, a release time, an offering of a pre-release, a pre-release date, and a pre-release time. In further implementations, the pre-release date and pre-release time options are not displayed until the option for an offering of a pre-release is affirmed. The options to select a release date and a pre-release date can be implemented using a date picker control element. The options to select a release time and a pre-release time can be implemented using a drop-down list control element. The option to offer a pre-release can be implemented using radio buttons having "Yes/No" options for the user to select whether to offer a pre-release. Various constraints can be enforced upon the selections of the dates and times. For example, the pre-release date and time selected can be constrained to at least twenty-four hours before the release date. In some implementations, the options preclude selections where a selected pre-release date is on the same date as or after the selected release date.

At 504, the process 500 includes receiving information describing the selected options described above. In some implementations, the received information does not describe a release time or a pre-release time. Depending on whether a pre-release is offered, information relating to the pre-release may be missing. For example, the information does not include a pre-release date or a pre-release time if the offering of a pre-release is not selected.

At 506, the process 500 verifies whether the information describes an affirmation of a pre-release of the recording. If a pre-release offering is confirmed, the process 500 includes, at 508, providing a truncated version of the recording. The recording and the truncated version of the recording can include similar international standard codes for uniquely identifying media recordings, such as ISRC codes. The recording and the truncated version of the recording can also include different product codes for uniquely identifying a trade item, such as UPCs.

A recording can first be provided, and a truncated version of the recording can be generated manually or through automatic means. For example, a truncated version of the recording can be generated through the use of graphical control elements for truncation points. Another example includes generating truncated versions of recordings using trained neural networks. In other implementations, the truncated version of the recording is provided by the user through an uploaded file.

If a pre-release offering is confirmed, the process 500 includes, at 510, transmitting the truncated version of the recording to a digital streaming platform for publishing. The truncated version of the recording can include metadata describing the selected pre-release date.

At 504, the process 500 includes transmitting the recording to a digital streaming platform for publishing. The recording can include metadata describing the selected release date. The recording and the truncated version of the recording can be associated under a same data file having metadata describing recording information.

Figure 6:
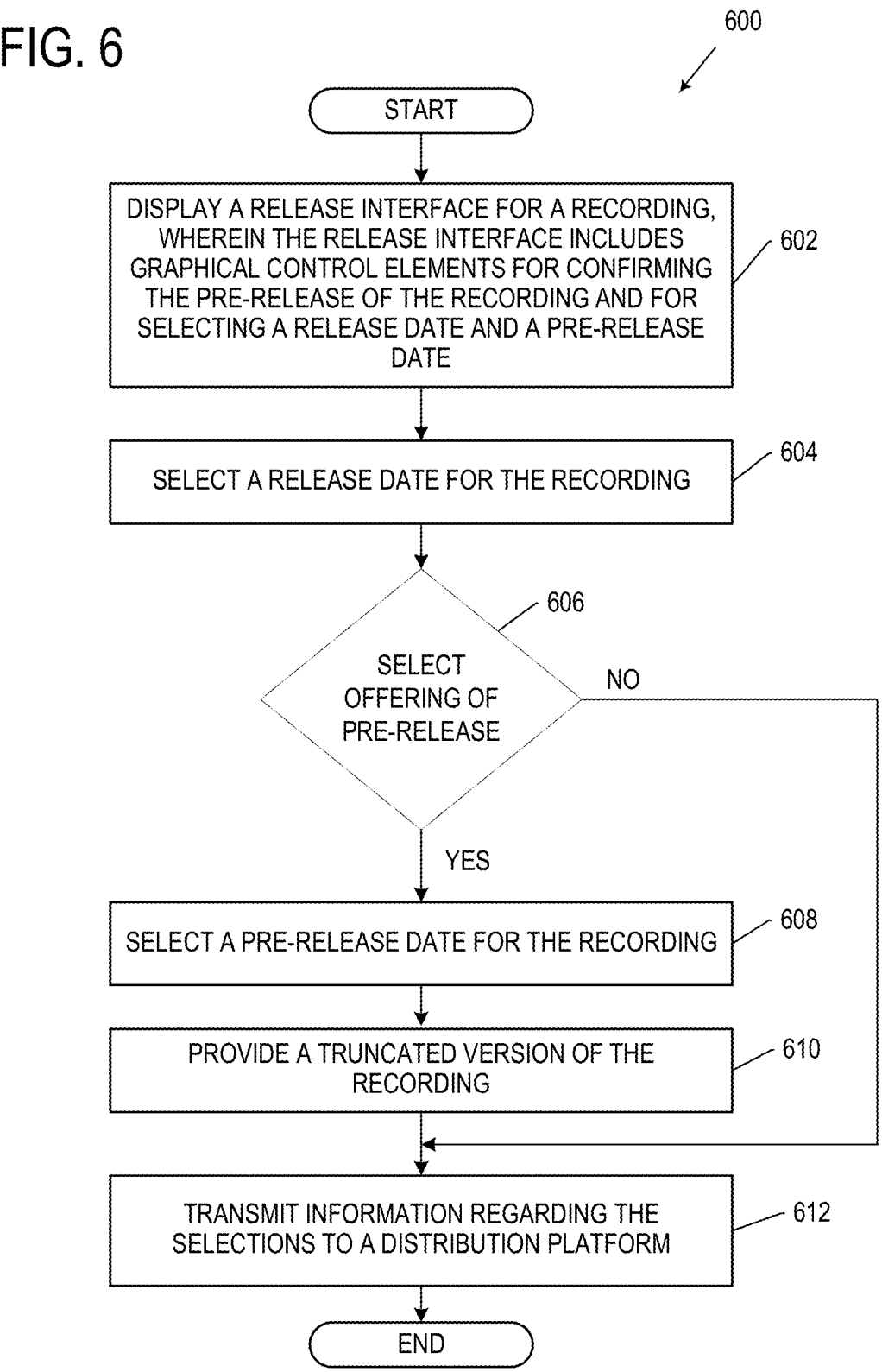
FIG. 6 is a flow diagram schematically illustrating an example process of offering a pre-release within a full release of a recording, which may be enacted on the client computing device of FIG. 1.

On the client side of the user interface, a process for offering a pre-release can be implemented. FIG. 6 is a flow diagram schematically illustrating an example process 600 of offering a pre-release within a full release of a recording to a distribution platform. At 602, the process 600 includes displaying a release interface for a recording. The release interface can include a graphical control element that allows the user to select from a set of predefined options. In some implementations, the release interface includes graphical control elements that allow the user to select a release date, a release time, an offering of a pre-release, a pre-release date, and a pre-release time. In further implementations, the pre-release date and pre-release time options are not displayed until the option for an offering of a pre-release is affirmed.

At 604, the process 600 includes selecting a release date for the recording. The option to select a release date can be implemented using a date picker control element. In some implementations, the process 600 further includes selecting a release time for the recording. The option to select a release time can be implemented using a drop-down list control element.

At 606, the process 600 includes selecting whether to offer a pre-release of the recording. The option to offer a pre-release can be implemented using radio buttons having "Yes/No" options for the user to select whether to offer a pre-release.

If the user selects to offer the pre-release, the process 600 includes, at 608, selecting a pre-release date for the recording. The option to select a pre-release date can be implemented using a date picker control element. In some implementations, the options preclude selections where a selected pre-release date is on the same date as or after the selected release date. In some implementations, the process 600 further includes selecting a release time for the recording. The option to select a pre-release release time can be implemented using a drop-down list control element. Various constraints can be applied upon the options. For example, the pre-release date and time selected can be constrained to at least twenty-four hours before the release date. In some implementations, the pre-release date and pre-release time options are not displayed until the option for an offering of a pre-release is affirmed.

If the user selects to offer the pre-release, the process 600 includes, at 610, providing a truncated version of the recording. In some implementations, the user provides the recording to the distribution platform, and the distribution platform uses the recording to generate a truncated version. For example, a truncated version of the recording can be generated through the use of graphical control elements for truncation points. Another example includes generating truncated versions of recordings using trained neural networks. In other implementations, the truncated version of the recording is provided by the user through an uploaded file. In other implementations, the user provides a truncated version of the recording by uploading a file containing a section of the recording to the distribution platform.

At 612, the process 600 includes transmitting information regarding the selections to a distribution platform.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
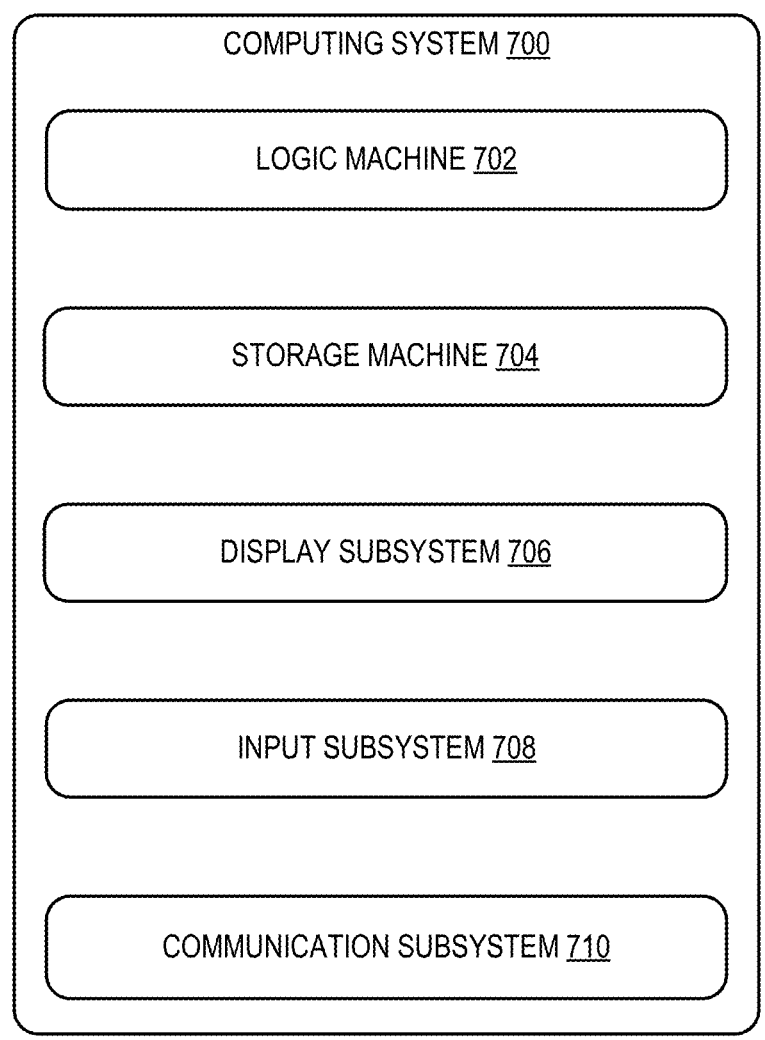
FIG. 7 shows a schematic view of an example computer environment that may be utilized to implement the system of FIG. 2.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices.

Computing system 700 includes a logic machine 702 and a storage machine 704. Computing system 700 may optionally include a display subsystem 706, input subsystem 708, communication subsystem 710, and/or other components not shown in FIG. 7.

Logic machine 702 includes one or more physical devices configured to execute instructions. For example, the logic machine 702 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 702 may include one or more processors configured to execute software instructions. Additionally or alternatively, the logic machine 702 may include one or more hardware or firmware logic machines configured to execute hardware or firmware instructions. Processors of the logic machine 702 may be single-core or multi-core, and the instructions executed thereon may be configured for sequential, parallel, and/or distributed processing. Individual components of the logic machine 702 optionally may be distributed among two or more separate devices, which may be remotely located and/or configured for coordinated processing. Aspects of the logic machine 702 may be virtualized and executed by remotely accessible, networked computing devices configured in a cloud-computing configuration.

Storage machine 704 includes one or more physical devices configured to hold instructions executable by the logic machine 702 to implement the methods and processes described herein. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via logic machine 702 executing instructions held by storage machine 704 It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 706 may be used to present a visual representation of data held by storage machine 704. This visual representation may take the form of a graphical user interface (GUI). As the herein described methods and processes change the data held by the storage machine 704, and thus transform the state of the storage machine 704, the state of display subsystem 706 may likewise be transformed to visually represent changes in the underlying data. Display subsystem 706 may include one or more display devices utilizing virtually any type of technology. Such display devices may be combined with logic machine 702 and/or storage machine 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem 708 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem 710 may be configured for communication via a wireless telephone network, or a wired or wireless local- or wide-area network. In some embodiments, the communication subsystem 710 may allow computing system 700 to send and/or receive messages to and/or from other devices via a network such as the Internet.

The following paragraphs provide additional support for the claims of the subject application. One aspect provides a computer system for implementing a pre-release of a recording at a distribution platform. The computer system comprises a processor coupled to a storage system that stores instructions, which, upon execution by the processor, cause the processor to present a release interface for the recording, where the release interface includes a first graphical control element having options for confirming the pre-release of the recording, a second graphical control element having options for selecting a release date, and a third graphical control element having options for selecting a pre-release date. The instructions further cause the processor to receive information describing a confirmation of the pre-release of the recording, a selected release date, and a selected pre-release date, wherein the selected pre-release date is before the selected release date. The instructions further cause the processor to provide a truncated version of the recording for the pre-release of the recording. The instructions further cause the processor to transmit the truncated version of the recording to a digital streaming platform, wherein the transmitted truncated version of the recording includes metadata describing the selected pre-release date. In this aspect, additionally or alternatively, the instructions further cause the processor to transmit the recording to the digital streaming platform, wherein the transmitted recording includes metadata describing the selected release date. In this aspect, additionally or alternatively, the release interface further includes a fourth graphical control element having options for selecting a release time and a fifth graphical control element having options for selecting a pre-release time. The received information further describes a selected release time and a selected pre-release time. The truncated version of the recording includes metadata describing the pre-release time. In this aspect, additionally or alternatively, the options for selecting the pre-release date preclude options where the selected pre-release date is the same as or after the selected release date. In this aspect, additionally or alternatively, the options for selecting the pre-release time preclude options where the selected pre-release date and time is less than twenty-four hours before the selected release date and time. In this aspect, additionally or alternatively, providing the truncated version of the recording includes receiving an upload of the truncated version of the recording. In this aspect, additionally or alternatively, providing the truncated version of the recording includes providing the recording and generating the truncated version of the recording using a neural network with the provided recording as an input. In this aspect, additionally or alternatively, the release interface further includes a fourth graphical control element having options for selecting at least one truncation point. The received information further describes at least one selected truncation point and providing the truncated version of the recording includes providing the recording and generating the truncated version of the recording using the provided recording and the at least one selected truncation point. In this aspect, additionally or alternatively, the recording and the truncated version of the recording include similar international standard codes for uniquely identifying media recordings and different product codes for uniquely identifying a trade item. In this aspect, additionally or alternatively, the recording and the truncated version of the recording are associated under a same data file having metadata describing recording information.

Another aspect provides a method for implementing a pre-release of a recording at one or more processors of one or more server computing devices of a distribution platform. The method comprises presenting a release interface for the recording, where the release interface includes a first graphical control element having options for confirming the pre-release of the recording, a second graphical control element having options for selecting a release date, and a third graphical control element having options for selecting a pre-release date. The method further comprises receiving information describing a confirmation of the pre-release of the recording, a selected release date, and a selected pre-release date, wherein the selected pre-release date is before the selected release date. The method further comprises providing a truncated version of the recording for the pre-release of the recording. The method further comprises transmitting the truncated version of the recording to a digital streaming platform, wherein the transmitted truncated version of the recording includes metadata describing the selected pre-release date. In this aspect, additionally or alternatively, the method further comprises transmitting the recording to the digital streaming platform, wherein the transmitted recording includes metadata describing the selected release date. In this aspect, additionally or alternatively, the release interface further includes a fourth graphical control element having options for selecting a release time and a fifth graphical control element having options for selecting a pre-release time. The received information further describes a selected release time and a selected pre-release time. The truncated version of the recording includes metadata describing the pre-release time. In this aspect, additionally or alternatively, the options for selecting the pre-release date preclude options where the selected pre-release date is the same as or after the selected release date. In this aspect, additionally or alternatively, the options for selecting the pre-release time preclude options where the selected pre-release date and time is less than twenty-four hours before the selected release date and time. In this aspect, additionally or alternatively, providing the truncated version of the recording includes receiving an upload of the truncated version of the recording. In this aspect, additionally or alternatively, providing the truncated version of the recording includes providing the recording and generating the truncated version of the recording using a neural network with the provided recording as an input. In this aspect, additionally or alternatively, the release interface further includes a fourth graphical control element having options for selecting at least one truncation point. The received information further describes at least one selected truncation point. Providing the truncated version of the recording includes providing the recording and generating the truncated version of the recording using the provided recording and the at least one selected truncation point. In this aspect, additionally or alternatively, the recording and the truncated version of the recording include similar international standard codes for uniquely identifying media recordings and different product codes for uniquely identifying a trade item.

Another aspect provides a method for offering a pre-release of a recording. The method comprises displaying a release interface for the recording, where the release interface includes a first graphical control element having options for confirming the pre-release of the recording, a second graphical control element having options for selecting a release date, and a third graphical control element having options for selecting a pre-release date. The method further comprises transmitting information to a distribution platform, where the information describes a confirmation of the pre-release of the recording, a selected release date, and a selected pre-release date, and where the selected pre-release date is before the selected release date. The method further comprises providing a truncated version of the recording to the distribution platform.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer system for implementing a pre-release of a recording at a distribution platform, the computer system comprises:
   a processor coupled to a storage system that stores instructions, which, upon execution by the processor, cause the processor to:
      present a release interface for the recording, the release interface including a first graphical control element having options for confirming the pre-release of the recording, a second graphical control element having options for selecting a release date, and a third graphical control element having options for selecting a pre-release date;
      receive information describing:
         a confirmation of the pre-release of the recording;
         a selected release date; and
         a selected pre-release date, wherein the selected pre-release date is before the selected release date;
      provide a truncated version of the recording for the pre-release of the recording; and
      transmit the truncated version of the recording to a digital streaming platform, wherein the transmitted truncated version of the recording includes metadata describing the selected pre-release date.

2. The computer system of claim 1, wherein the storage system further stores instructions, which, upon execution by the processor, cause the processor to:
   transmit the recording to the digital streaming platform, wherein the transmitted recording includes metadata describing the selected release date.

3. The computer system of claim 1, wherein:
   the release interface further includes a fourth graphical control element having options for selecting a release time and a fifth graphical control element having options for selecting a pre-release time;
   the received information further describes a selected release time and a selected pre-release time; and
   the truncated version of the recording includes metadata describing the pre-release time.

4. The computer system of claim 3, wherein the options for selecting the pre-release date preclude options where the selected pre-release date is the same as or after the selected release date.

5. The computer system of claim 4, wherein the options for selecting the pre-release time preclude options where the selected pre-release date and time is less than twenty-four hours before the selected release date and time.

6. The computer system of claim 1, wherein providing the truncated version of the recording includes receiving an upload of the truncated version of the recording.

7. The computer system of claim 1, wherein providing the truncated version of the recording includes:
   providing the recording; and
   generating the truncated version of the recording using a neural network with the provided recording as an input.

8. The computer system of claim 1, wherein:
   the release interface further includes a fourth graphical control element having options for selecting at least one truncation point;
   the received information further describes at least one selected truncation point; and
   providing the truncated version of the recording includes:
      providing the recording; and
      generating the truncated version of the recording using the provided recording and the at least one selected truncation point.

9. The computer system of claim 1, wherein the recording and the truncated version of the recording include similar international standard codes for uniquely identifying media recordings and different product codes for uniquely identifying a trade item.

10. The computer system of claim 1, wherein the recording and the truncated version of the recording are associated under a same data file having metadata describing recording information.

11. A method for implementing a pre-release of a recording at one or more processors of one or more server computing devices of a distribution platform, the method comprising:
   presenting a release interface for the recording, the release interface including a first graphical control element having options for confirming the pre-release of the recording, a second graphical control element having options for selecting a release date, and a third graphical control element having options for selecting a pre-release date;
   receiving information describing:
      a confirmation of the pre-release of the recording;
      a selected release date; and
      a selected pre-release date, wherein the selected pre-release date is before the selected release date;
   providing a truncated version of the recording for the pre-release of the recording; and
   transmitting the truncated version of the recording to a digital streaming platform, wherein the transmitted truncated version of the recording includes metadata describing the selected pre-release date.

12. The method of claim 11, further comprising transmitting the recording to the digital streaming platform, wherein the transmitted recording includes metadata describing the selected release date.

13. The method of claim 11, wherein:
   the release interface further includes a fourth graphical control element having options for selecting a release time and a fifth graphical control element having options for selecting a pre-release time;
   the received information further describes a selected release time and a selected pre-release time; and
   the truncated version of the recording includes metadata describing the pre-release time.

14. The method of claim 13, wherein the options for selecting the pre-release date preclude options where the selected pre-release date is the same as or after the selected release date.

15. The method of claim 14, wherein the options for selecting the pre-release time preclude options where the selected pre-release date and time is less than twenty-four hours before the selected release date and time.

16. The method of claim 11, wherein providing the truncated version of the recording includes receiving an upload of the truncated version of the recording.

17. The method of claim 11, wherein providing the truncated version of the recording includes:
    providing the recording; and
    generating the truncated version of the recording using a neural network with the provided recording as an input.

18. The method of claim 11, wherein:
    the release interface further includes a fourth graphical control element having options for selecting at least one truncation point;
    the received information further describes at least one selected truncation point; and
    providing the truncated version of the recording includes:
        providing the recording; and
        generating the truncated version of the recording using the provided recording and the at least one selected truncation point.

19. The method of claim 11, wherein the recording and the truncated version of the recording include similar international standard codes for uniquely identifying media recordings and different product codes for uniquely identifying a trade item.

20. A method for offering a pre-release of a recording, the method comprising:
    displaying a release interface for the recording, the release interface including a first graphical control element having options for confirming the pre-release of the recording, a second graphical control element having options for selecting a release date, and a third graphical control element having options for selecting a pre-release date;
    transmitting information to a distribution platform, the information describing:
        a confirmation of the pre-release of the recording;
        a selected release date; and
        a selected pre-release date, wherein the selected pre-release date is before the selected release date; and
    providing a truncated version of the recording to the distribution platform.

* * * * *